D. O. WARD, DEC'D.
N. L. WARD, ADMINISTRATRIX.
SELF LOCKING NUT.
APPLICATION FILED APR. 15, 1912.
1,077,023.
Patented Oct. 28, 1913.
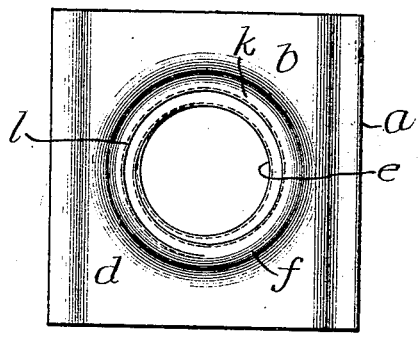
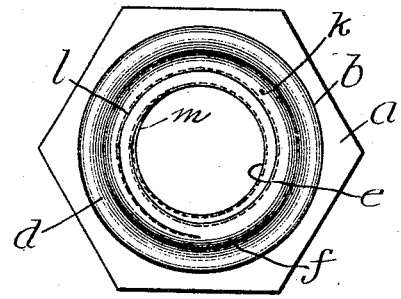
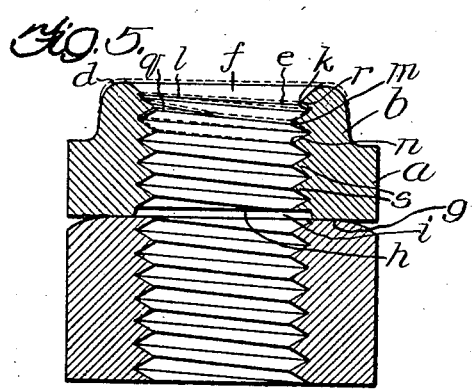
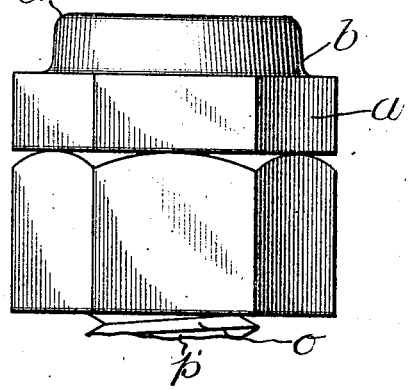
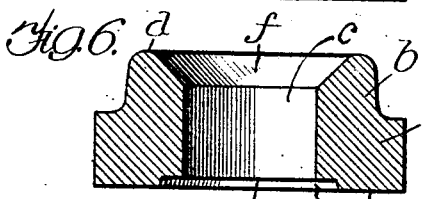
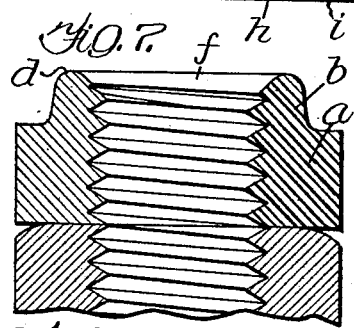
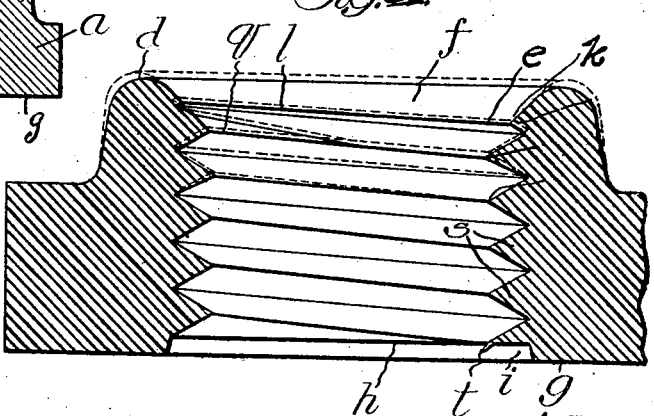
Witnesses:
Inventor:
Daniel O. Ward
By Harry Irwin Cromer
Atty.

UNITED STATES PATENT OFFICE.

DANIEL O. WARD, OF OAK PARK, ILLINOIS; NELLIE LEE WARD ADMINISTRATRIX OF SAID DANIEL O. WARD, DECEASED.

SELF-LOCKING NUT.

1,077,023.  Specification of Letters Patent.  Patented Oct. 28, 1913.

Application filed April 15, 1912. Serial No. 690,780.

*To all whom it may concern:*

Be it known that I, DANIEL O. WARD, a citizen of the United States, residing in Oak Park, in the county of Cook and State of Illinois, have invented certain new and useful Improvements in Self-Locking Nuts, of which the following is a specification.

This invention relates to that class of self-locking nuts or nut locks having a bolt-receiving aperture and comprising a screw thread having substantially parallel helical thread portions of unequal pitch or located at unequal distances from each other, or having a recessed body portion projecting beyond the end of a screw thread having compressed or substantially parallel helical thread portions of varying pitch or located unequal distances from each other, and to the process or method of making the same.

The principal object of the invention is to provide a simple, economical and efficient self-locking nut or nut lock, and an improved process of making the same.

A further object of the invention is to provide a self-locking nut or nut lock comprising a screw thread having helical substantially parallel thread portions located at unequal distances from each other and so constructed that the compressed or relatively closely spaced portions of the thread will be sufficiently strong and will be a sufficient distance from the axial center of the nut to prevent the distortion and weakening of such bolt-engaging and locking portion of the thread, and to enable the outermost turn or bolt-engaging and locking portion of the thread to be compressed longitudinally of the nut toward the next adjacent turn or lap and inward toward the axis of the nut without thereby bringing the inner edge of such compressed or bolt-engaging thread portion nearer to the axis of the nut than is desirable with respect to the inner edges of the other threads, or laps, and to enable a thread portion the inner edge of which—as cut—is a greater distance from the axis of the nut than the inner edge of the next adjacent inner turn or lap of the thread, to be made and compressed inward toward the latter and inward toward the axis of the nut into such a position that one and preferably both of the side surfaces of such depressed or locking portion of the thread can engage the helical threads of an ordinary bolt and cause the nut to be securely held against accidental or unintentional rotation and to have a binding tendency upon the threads of the bolt both transversely and longitudinally of the nut, or transversely and up and down. The binding tendency or effect up and down or longitudinally of the nut is produced by the compression of adjacent turns of the threads into closer relation to each other, and the binding effect transversely of the nut is caused by the forcing of the threads inward toward the axis of the nut so as to reduce the diameter of the threaded portion which is thus compressed and simultaneously compressing the outermost turn of the thread toward the next adjacent turn. The outermost turn of the thread being a greater distance from the axial center of the nut before compression than the other inner normally spaced turns or threads, by reason of the conical surface or relatively wide mouth of the aperture at the point where the end of the thread is formed before compression enables the end thread or turn to be forced inward toward the axis of the nut during the compression of the threads without causing such end thread or turn to come nearer to the axis of the nut than is desired.

A further object is to enable the compression of the shoulder or body portion of the nut and the compression or bringing into proper position of the locking portion of the thread to be accomplished without distorting or injuriously affecting the thread or the bur upon the thread at either end of the nut or of the thread, and in such a manner as to obtain the desired uniform taper of the threaded aperture of a nut having unequally spaced helical or self-locking thread portions to be obtained when desired.

A further object is to provide an improved process whereby such a nut may be made in commercial quantities and with facility and economy, and whereby the purposes of the invention may be accomplished and self-locking nuts having the advantages set forth may be made in an efficient manner.

Other and further objects of the invention will appear from an examination of the drawings, and from the following description and claims.

The invention consists in the features, combinations, and details of construction, herein described and claimed, and in the process described and claimed.

In the accompanying drawings, Figure 1 is a plan or end view of a square self-locking nut or nut lock constructed in accordance with my invention and improvements; Fig. 2, a similar end view of a six-sided nut or nut-lock constructed in accordance with my invention and improvements; Fig. 3, a view in side elevation of the self-locking nut or nut lock shown in Fig. 2, showing the same upon a bolt and in engagement with an ordinary nut; Fig. 4, a view taken through the center of Fig. 2, with a portion broken away; Fig. 5, a view in central vertical section of the nut and nut-locking member shown in Fig. 3; Fig. 6, a view in central section of a perforated blank or self-locking nut, before being threaded or compressed; and Fig. 7, a view in central section, of a self-locking nut constructed in accordance with my invention, but without the recess in the non-shouldered or starting end.

In making a self-locking nut or nut lock in accordance with my invention and improvements, I provide a blank $a$ of metal, and form on the main body portion of such blank a shoulder $b$. This may be accomplished by passing the blank between suitably constructed metal rolls having peripheral recesses corresponding with the shoulder $b$ or projecting portions of the nut, and having peripheral flanges or shoulders or projecting portions corresponding with and adapted to form the recessed portions of the nut.

Any ordinary well known or desired form of rolls may be used, and it is therefore not deemed necessary or desirable to describe or illustrate the same here, and such description is believed to be unnecessary in order to enable those skilled in the art to understand, practise, make and use the invention herein described and claimed. The blank, formed and perforated as shown in Fig. 6 may also be formed by means of a stamping machine, or stamp and die and punch, or in any desired ordinary or well known manner, and these mechanisms are not described or shown for the reasons set forth with respect to the metal rolls. The aperture $c$, however, should be and, by preference, is made simultaneously with or directly after the formation of the projecting boss or shoulder, or body portion $b$, and the mouth of the aperture is of greater diameter than the main or inner part and is conical or inwardly tapering either at one or both ends of the nut or aperture, as shown in Fig. 6. In thus forming the blank, an end portion $d$ of the metallic body or boss is so formed as to extend or project endwise of the nut beyond the outermost lap of the thread $e$, and this end or boss portion $d$ encircles the aperture in such a manner as to form an inclined conical or inwardly tapered surface portion $f$ which extends from the narrowest or main inner wall portion of the aperture outward at an oblique angle with respect to the axis of the nut and endwise beyond the end of the threaded portion of the aperture or of the portion to be threaded.

The opposite end of the nut, when made in the form which I consider the best, has a body portion $g$ which extends or projects endwise beyond the end lap $h$ of the screw thread and encircles the aperture so as to form a non-threaded endwise projecting nut portion or recessed portion $i$ the inner wall or periphery of which is of greater diameter than the main or inner threaded portion of the recess. The recessed or non-threaded inclined or conical and inwardly tapered wall portion $f$ at the opposite end of the nut is also, by preference, of greater diameter at the extreme outer end of the nut than is the main or inner threaded portion of the aperture and extends inward to the inner edge of the thread at an oblique angle with respect to the axis of the nut, so that when the thread is cut its outer lap will have a side surface $k$ extending outward at an incline from its inner edge and at an oblique angle with respect to the axis of the nut throughout the entire length of such outer lap or outermost portion of the thread, which is thus rendered much stronger and of greater thickness at its base than it would otherwise be.

The blank having been formed and provided with the bolt-receiving aperture as above suggested, the next step in the process of making the nut is to cut the spiral or helical thread $e$, so that it will—as cut—form a plurality of parallel helical thread portions or laps which encircle the aperture at equal distances from one another, or each at an equal distance from the adjacent lap or laps. The end portion $d$ of the nut body or of the boss $b$, which encircles the aperture and extends endwise of the nut beyond the outermost lap of the thread $e$ is then compressed by being struck by a plunger or hammer while the nut rests upon a suitable support, such as a bed plate of a press or bulldozer. This causes the metal which forms the surface $f$—see Fig. 4—to be forced inward longitudinally and toward the axis of the nut at an oblique angle with respect to such axis in such a manner that the surface $k$ of the outer lap of the thread will be forced inward and remain a sufficient distance from the next lap of the thread to enable the surface $k$ to engage the thread of a bolt on which the nut is to be mounted. The edge $l$ of the outermost or end lap of the thread $e$ will be forced inward toward the axis of the nut and also inward or downward in the direction of the next adjacent thread or lap from the position indicated in dotted lines in Figs. 2 and 4, to the position indicated in full lines in said figures. The thread encircling portion of the boss b will also be compressed sufficiently to force the next lap m of the thread inward toward the axial center of the nut and downward toward the next adjacent inner lap n but not so far as the edge l of the outermost lap has been shifted, as indicated in Figs. 2 and 4, in which the original position of the inner edge of the thread e is indicated by broken lines, and the position of the same after the completion of the compressing operation, is indicated in full lines. It will be noted that the edge l of the outermost or end lap r, before the compression, was a greater distance from the axis of the nut than the inner edges of the other laps,— the position of the edge l corresponding to the conformation or position of the surface f. The form of the projecting portion d and of the surface f, or recess, is such that not only is the outer or end lap of the thread made stronger and thicker at its root than it would otherwise be, but it is also protected from injury or undesirable distortion resulting from the compression of the portion d which projects endwise of the nut and laterally beyond the outermost lap of the thread, and the distance from the axis of the nut to the inner edge l of the outermost lap of the thread e before compression exceeds the distance from said axis to the inner edges of the other threads to a sufficient extent to enable the edge l to be moved inward farther than the other threads, when the compression takes place, and to thus be forced to exactly the proper position with respect to the edges of the other threads and the screw thread o of a bolt p on which the nut is to be mounted, so as to provide a self-locking nut which is adapted to be securely held or locked against unintentional rotation and so as to have a tendency to bind in directions both crosswise and longitudinally of the nut, and with great rigidity. The threaded portion of the nut is thus adapted to be tapered uniformly, so as to snugly fit a similarly tapered or ordinary threaded bolt, and the laps or edges l and q of the laps r and m of the thread e are brought closer together or closer to the next adjacent lap and the edge q of lap m closer to the axis of the nut than are the other laps s which remain in normal position and at a uniform distance from each other and from the adjacent laps.

The body portion g with its recess or non-threaded surface portion i of greater diameter than the threaded aperture serves to protect the end lap h and the bur t on said lap from being distorted, bent, or injured during the operation of compressing the opposite end portion of the nut to bring the laps of the thread into unequally spaced or locking position. The importance of thus preserving the starting thread and its bur from being distorted or bent, thus enabling the nut to be readily started upon the bolt, will be appreciated by those skilled in the art.

I claim:

1. A self-locking nut comprising a main body portion, having a bolt receiving aperture provided with adjacent helical thread portions encircling the aperture, the upper laps of which are disposed at a less distance from each other than the remaining laps of said thread, said main body portion encircling the aperture and projecting above the thread thereof, the projection receding away from the aperture at the closer threaded portion of the nut to the upper end of the nut.

2. A self-locking nut having a main body portion provided with a bolt-receiving aperture, and comprising in its construction a helical thread forming a plurality of convolutions or laps encircling the aperture and having their inner edges located at unequal distances from each other, the outermost lap of said thread having a side surface extending entirely therearound and outward laterally and endwise of the nut to the end thereof at an oblique angle with respect to the axis of the nut.

3. A self-locking nut comprising a main body portion, having a bolt receiving aperture provided with a helical thread, said main body portion being provided with non-threaded nut portions encircling the aperture and projecting beyond the thread of the latter at opposite ends of said nut, the non-threaded nut portion at the upper end of the nut being compressed to force the end lap of the thread closer to the next adjacent lap, than the other laps are to each other while leaving a projection receding away from the threaded aperture to the upper end of the nut and the other non-threaded portion being adapted to shield the bottom end lap of the thread.

4. A self-locking nut comprising in its construction a main body portion having a bolt receiving aperture and provided with a helical thread having a plurality of laps encircling the aperture, the inner edges of the upper laps of said threads being positioned at a less distance from each other than the remaining laps of said thread, the upper portion of said nut having a conical recessed end surface portion extending outward laterally of the nut at an incline beyond the bolt engaging edge of the outermost lap of the thread and to the upper end of the nut, throughout the entire length of said lap.

5. A self-locking nut comprising a main body portion provided with a boss projecting from the top thereof, said nut being provided with a bolt receiving aperture passing through the main body portion thereof and through the boss projecting therefrom, the part of said aperture passing through the upper portion of said boss being flared outwardly to the upper end of the nut, said nut being also provided with a helical thread extending through the portion of the bolt receiving aperture in the main body of the bolt, and through a portion only of the flared upper end of said aperture, the inner edges of the upper laps of said thread being disposed at a less distance from each other than the remaining laps of the thread.

6. A self-locking nut of the character described comprising a metallic body having a threaded opening therein, a portion of the metal of the body being compressed to dispose adjacent convolutions of the thread closer together than those of another portion of said threaded opening, the compressed portion also projecting outwardly beyond the terminal convolution of the thread and therearound.

7. A self-locking nut of the character described comprising a metallic body having a threaded opening therein, a portion of the metal of the body being compressed to dispose adjacent convolutions of the thread closer together than those of another portion of said threaded opening, the compressed portion also projecting beyond the terminal convolution of the thread and therearound, said terminal receding laterally away from the normal opening in the body and merging into the inner wall of the projection.

8. A self locking nut of the character described having a major portion integral with a minor portion, the minor portion being cylindrical in form, both portions being pierced through from face to face of the nut and screw-threaded, the threads in the minor portion being spaced at a less distance apart than the threads in the major portion, the inner face of the cylindrical portion being uniformly beveled, said bevel completely encircling the screw threaded opening, the thread at that point extending part of the way around the beveled surface and being of a less height from the apex to the root of said thread than the height of the remaining portion of the thread, the thread in the major portion being adapted to easily mount and register with a bolt thread and the thread in the minor member being adapted to pinch the bolt thread.

DANIEL O. WARD.

Witnesses:
HARRY IRWIN CROMER,
JENNIE L. FISKE.